E. H. PIERSEN.
TELEGRAPH TRANSMITTER.
APPLICATION FILED JAN. 13, 1913.

1,224,956.

Patented May 8, 1917.
10 SHEETS—SHEET 1.

Fig. 1.

WITNESSES:
Arthur W. Caps.
Lewis L. Miller.

INVENTOR
Edwin H. Piersen.
BY
Arthur C. Brown
ATTORNEY

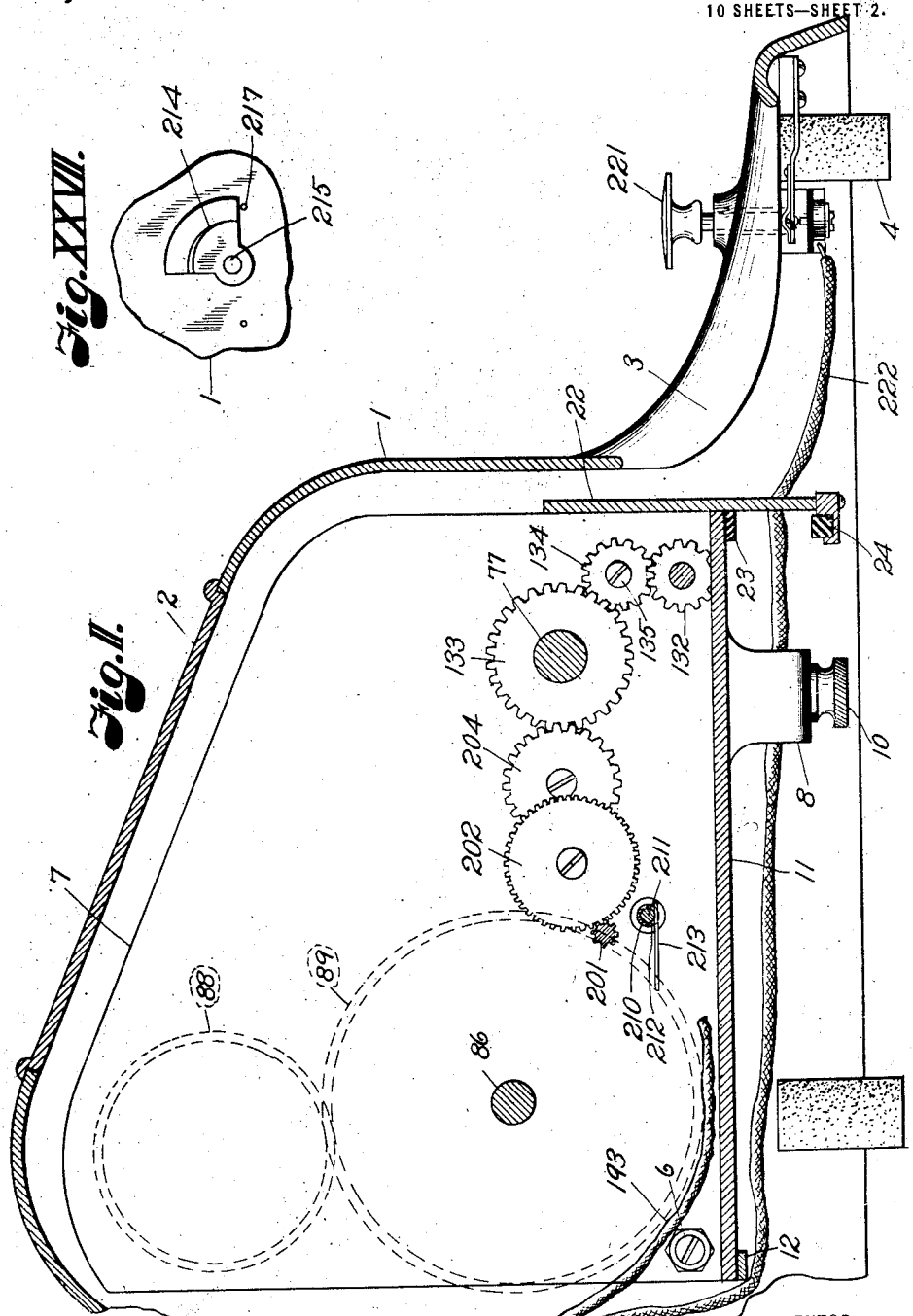

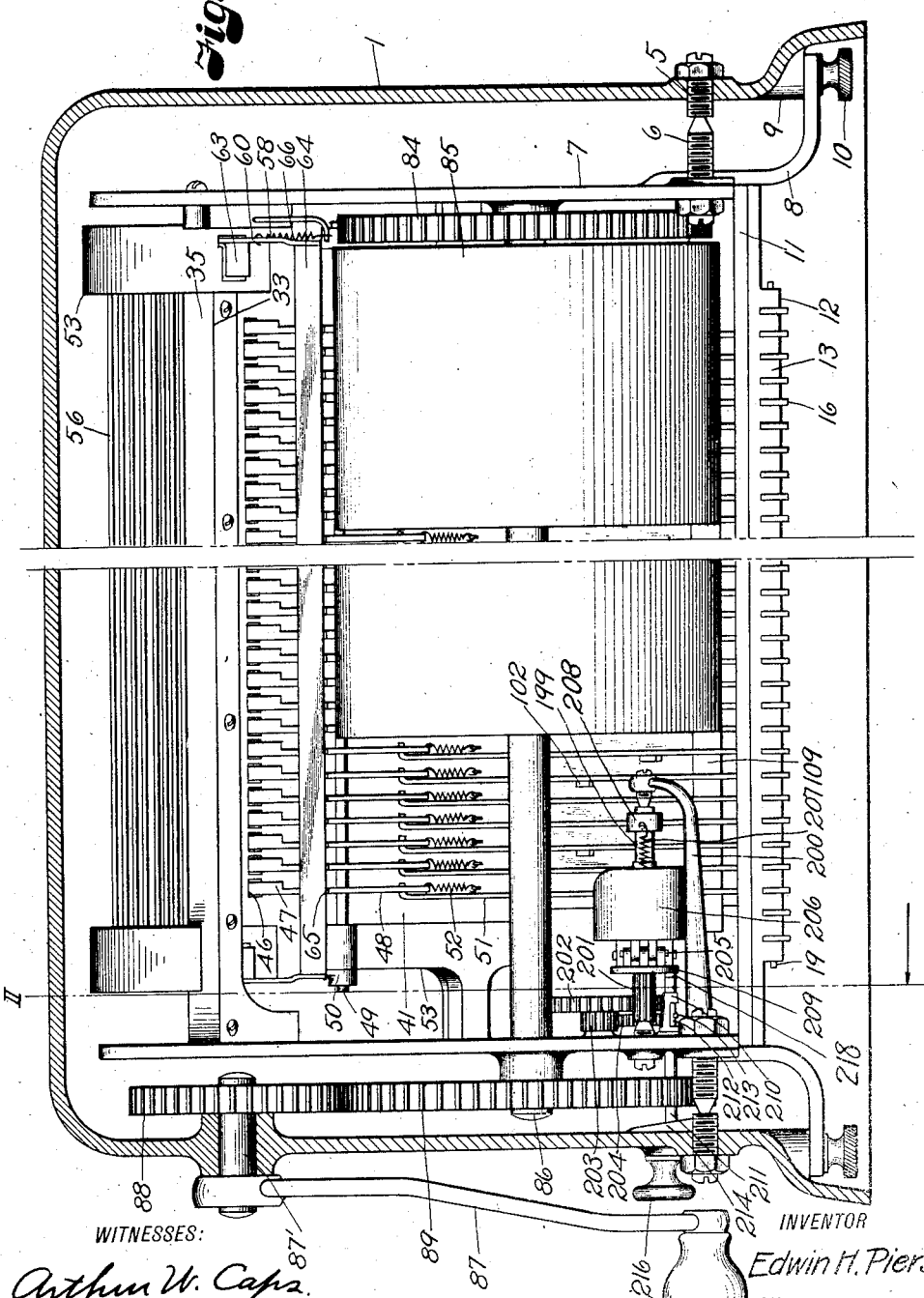

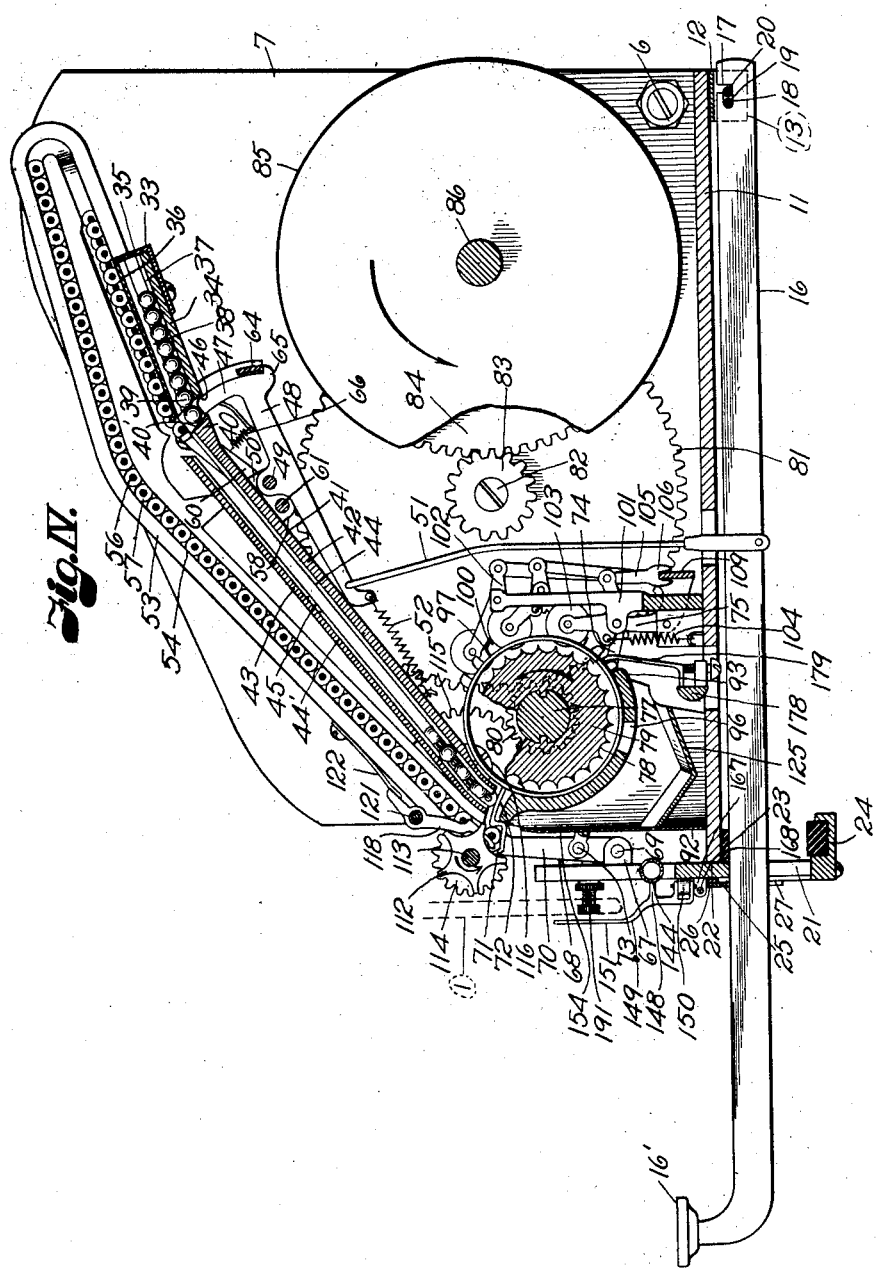

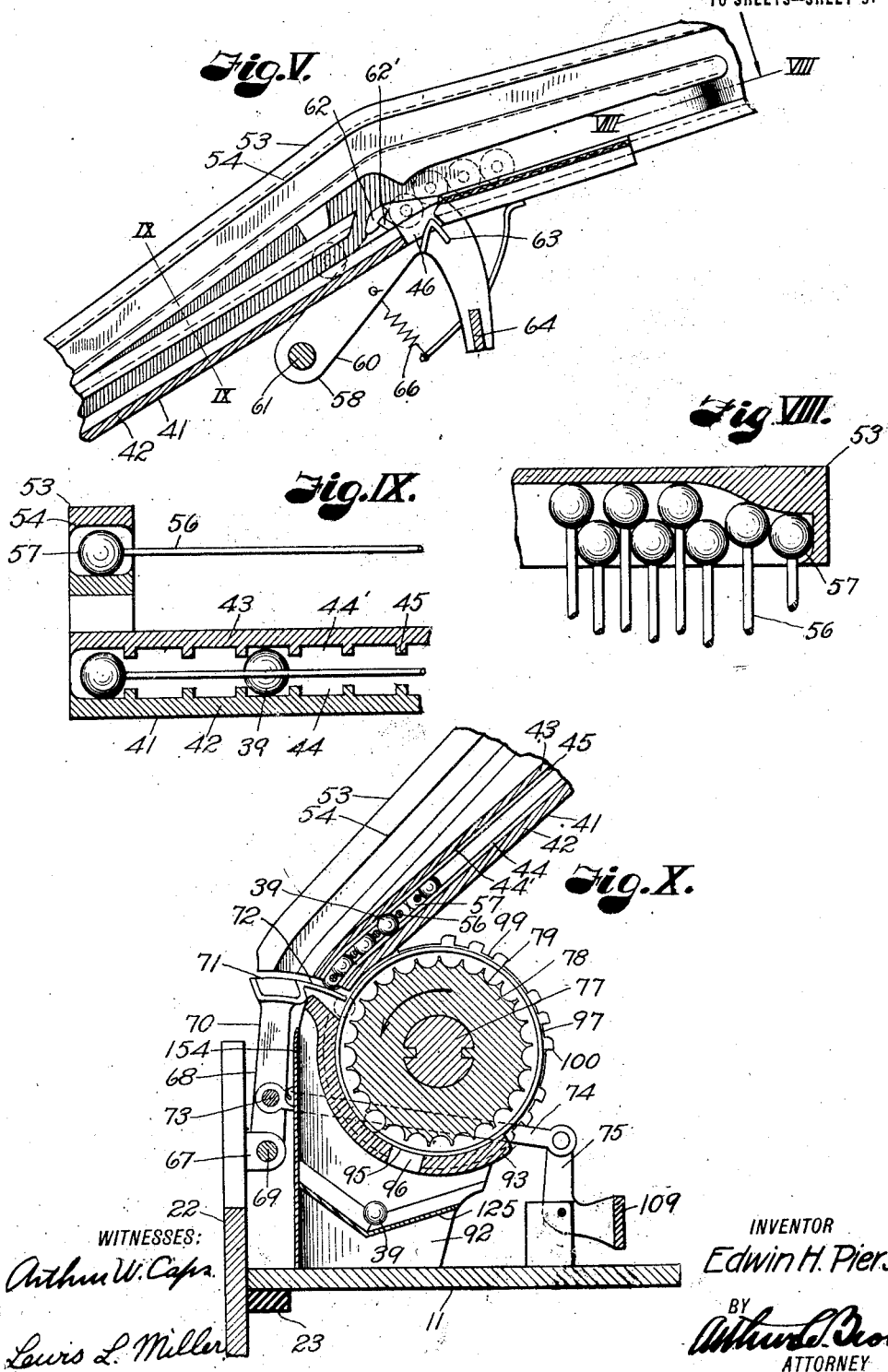

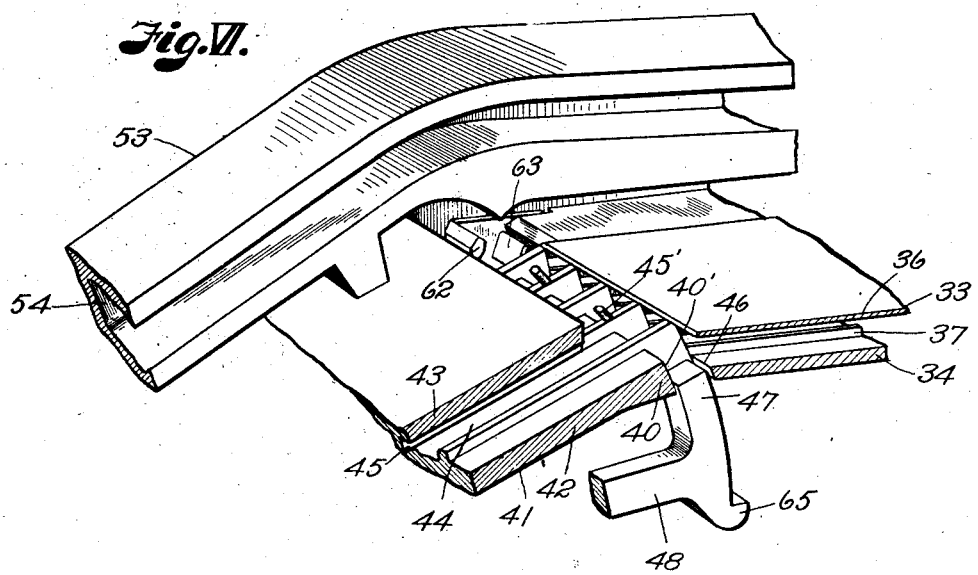
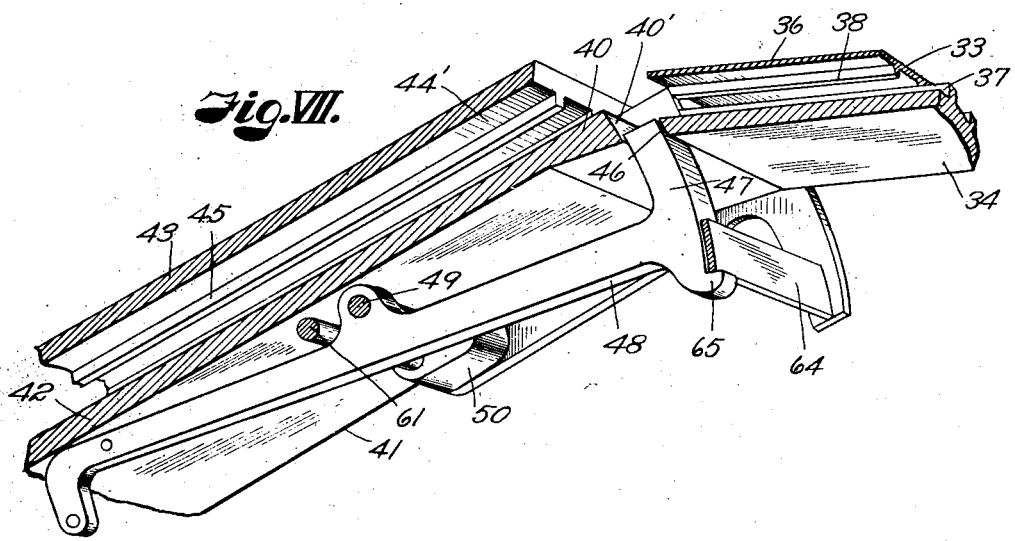

E. H. PIERSEN.
TELEGRAPH TRANSMITTER.
APPLICATION FILED JAN. 13, 1913.
1,224,956.
Patented May 8, 1917.
10 SHEETS—SHEET 7.
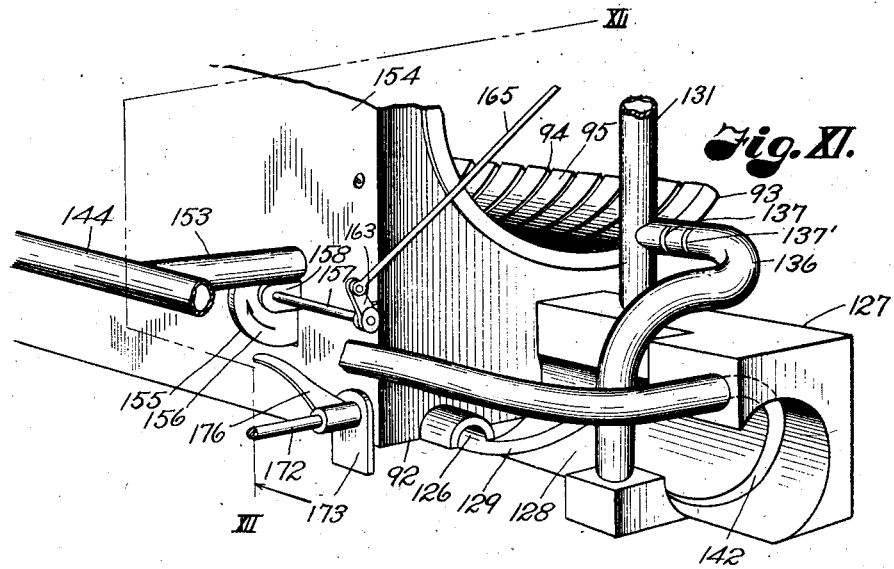
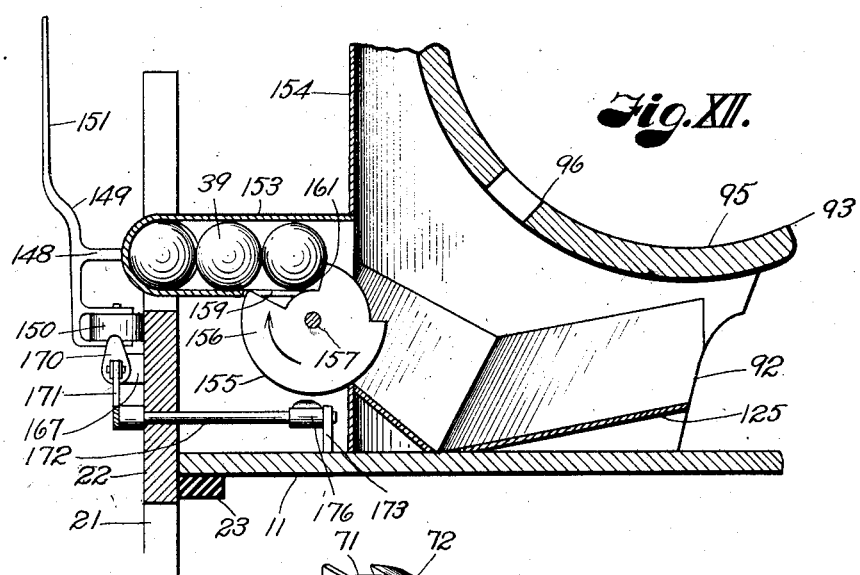
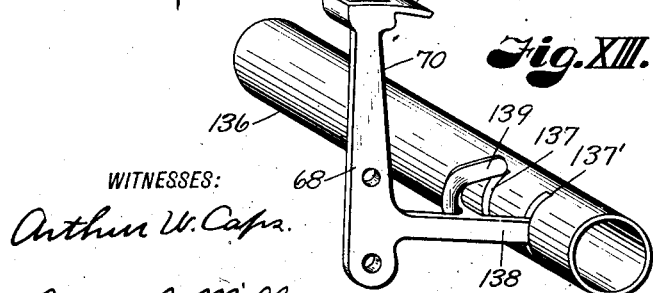
WITNESSES:
Arthur W. Capes.
Lewis L. Miller.
INVENTOR
Edwin H. Piersen.
BY
Arthur E. Brown
ATTORNEY E. H. PIERSEN.
TELEGRAPH TRANSMITTER.
APPLICATION FILED JAN. 13, 1913.
1,224,956.
Patented May 8, 1917.
10 SHEETS—SHEET 8.
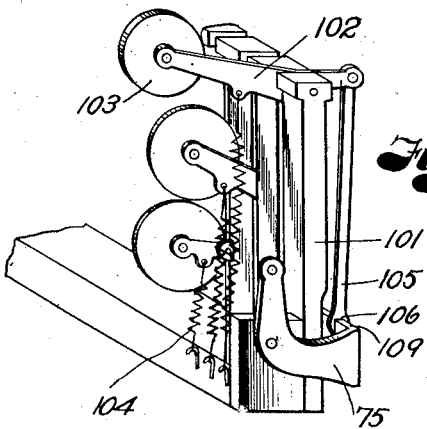
Fig. XIV.
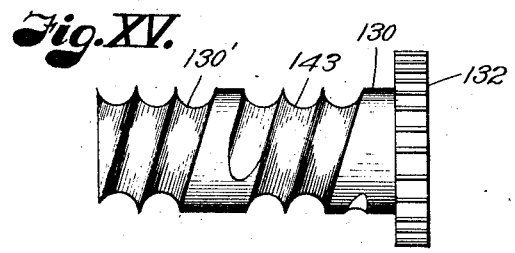
Fig. XV.
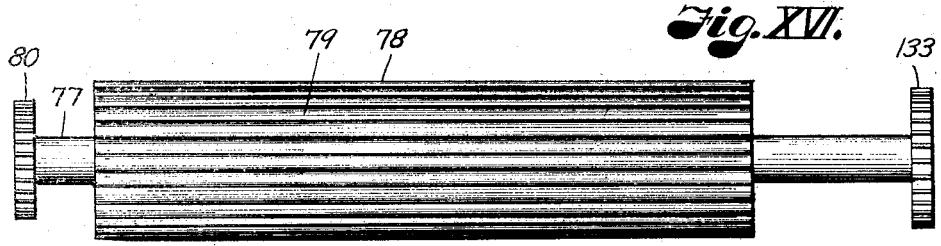
Fig. XVI.
WITNESSES:
Arthur W. Capp.
Lewis L. Miller
INVENTOR
Edwin H. Piersen.
BY
Arthur C. Brown
ATTORNEY E. H. PIERSEN.
TELEGRAPH TRANSMITTER.
APPLICATION FILED JAN. 13, 1913.
1,224,956.
Patented May 8, 1917.
10 SHEETS—SHEET 9.
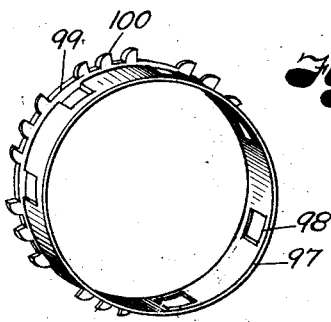
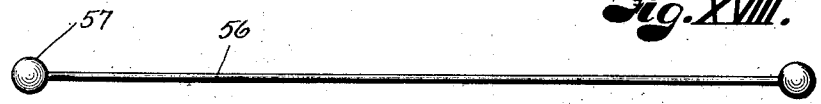
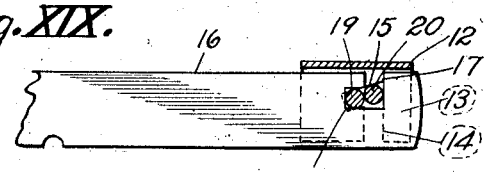
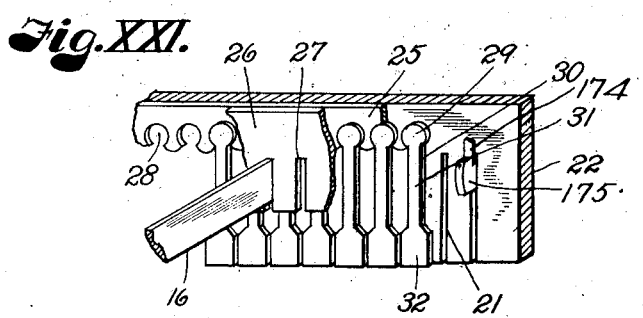
WITNESSES:
Arthur W. Caps.
Lewis L. Miller.
INVENTOR
Edwin H. Piersen.
BY
Arthur C. Brown
ATTORNEY

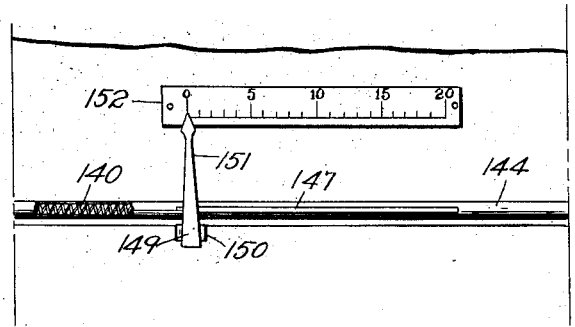
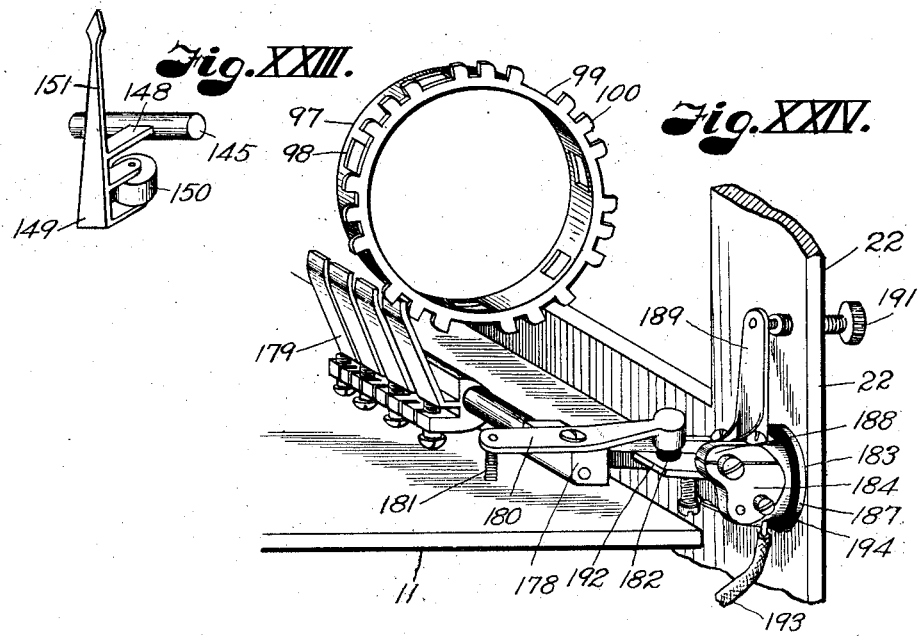
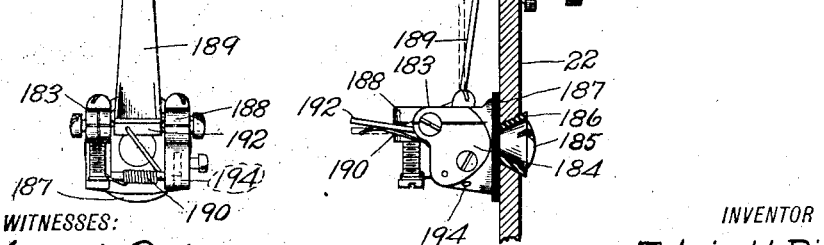

UNITED STATES PATENT OFFICE.

EDWIN H. PIERSEN, OF TOPEKA, KANSAS.

TELEGRAPH-TRANSMITTER.

1,224,956.  Specification of Letters Patent.  Patented May 8, 1917.

Application filed January 13, 1913. Serial No. 741,783.

*To all whom it may concern:*

Be it known that I, EDWIN H. PIERSEN, a citizen of the United States, residing at Topeka, in the county of Shawnee and State of Kansas, have invented certain new and useful Improvements in Telegraph-Transmitters; and I do declare the following to be a full, clear, and exact description of the invention, such as will enable others skilled in the art to which it appertains to make and and use the same, reference being had to the accompanying drawings, and to the letters and figures of reference marked thereon, which form a part of this specification.

My invention relates to telegraph transmitters, and has for its principal object to provide a keyboard apparatus for sending telegraphic messages, and wherein the symbol controlling members may be stored and released in proper sequence to properly transmit a message, irrespective of the speed or irregularity of operation of the keyboard.

In accomplishing this object, I have provided an apparatus comprising a plurality of individually operative character members, and tumblers for actuating the character members, together with means for releasing the tumblers and returning the parts to storage, whereby the character actuating tumblers may be accumulated and released in proper sequence irrespective of the speed at which the keyboard is operated.

A further object of the invention is to provide an indicator for showing the number of tumblers in storage at any time.

The structure forming the subject-matter of this application is distinguished from that of my copending application, Serial No. 739,295, in the tumbler spacing mechanism and means for controlling the same, the mechanism for actuating the character members through coöperation with the tumblers, the mechanism for returning the tumblers and spacers to storage, the indicator for informing the operator of the extent of accumulation, and in other features hereinafter described and illustrated in the accompanying drawings, wherein:—

Figure I is a perspective view of a telegraphic transmitter constructed according to my invention, the case being removed and parts broken away to better illustrate the mechanism.

Fig. II is a side elevation of the transmitter, the case being in vertical section.

Fig. III is a rear elevation of same, the case being in section.

Fig. IV is a vertical section of same, the case being removed.

Fig. V is a sectional elevation of the upper end of the chute, showing the upper verge for controlling the spacing rods.

Fig. VI is a detail perspective of the adjacent edges of the chute and hopper.

Fig. VII is a bottom plan view of the verge mechanism.

Fig. VIII is a horizontal view on the line VIII—VIII, Fig. V, showing the ends of the wand tumblers.

Fig. IX is a vertical section on the line IX—IX, Fig. V, showing the chute and elevator grooves.

Fig. X is a sectional elevation of the lower end of the chute and character disk driving mechanism, showing the lower verge for shifting the spacing rods.

Fig. XI is a perspective view of the character disk supporting segment, together with the elevator casing and tubing for delivering the tumblers to the indicating device.

Fig. XII is a sectional elevation on the line XII—XII, Fig. XI.

Fig. XIII is a detail perspective of the lower verge and the verge for bypassing tumblers into the indicating device.

Fig. XIV is a detail perspective of the roller mechanism for actuating the lower spacing rod verge.

Fig. XV is a detail view of the elevator worm.

Fig. XVI is a front elevation of the fluted cylinder for driving the character disks.

Fig. XVII is a perspective view of one of the character disks.

Fig. XVIII is a detail view of one of the spacing wands.

Fig. XIX is a detail view of one of the key levers.

Fig. XX is a sectional view of the hinge bracket for same.

Fig. XXI is a perspective view of the keeper set for insuring individual operation of the key levers.

Fig. XXII is a front elevation of the indicator, parts being broken away.

Fig. XXIII is a detail perspective of the indicator finger.

Fig. XXIV is a detail perspective of the contact breaker and actuating parts taken from the left-hand side.

Fig. XXV is a rear elevation of the contact breaker.

Fig. XXVI is a side elevation of same.

Fig. XXVII is an elevation of the governor regulating cam.

Referring more in detail to the parts:—

1 designates a casing having a body portion for containing the operative parts of the machine, and having a forwardly extended portion for inclosing the keyboard, the body having an opening in its upper portion normally closed by a cover 2, but through which access may be had to the machine parts, and the extension having an opening 3 through which the keyboard is exposed, the entire case being supported on rubber capped feet 4. In each side of the case are studs 5 (Fig. III), having end sockets for receiving pivot studs 6, that project from the sides 7 of the machine frame to pivotally mount the frame so that it may swing in the case and permit the forward portion of the case to be lifted away from the machine when it is desired to expose the parts for cleaning or repairing.

Also fixed to the forward ends of the frame are brackets 8 having downwardly and laterally offset portions adapted to underlie the case lugs 9 and having thumb screws 10 adapted to turn freely therein and thread into the lugs 9 so as to secure the machine within the casing when the latter is in normal position.

Extending along the rear underface of base plate 11 is a hinge rail 12 (Figs. III, XIX and XX) which is provided with a plurality of spaced partitions 13, having registering slots 14 opening through their lower edges and having downwardly and forwardly extending portions 15 at the top. Between the partitions are projected the rear ends of key levers 16, each of which has a slot 17 opening through its upper edge and provided with forwardly directed base portion 18.

When the key levers are in position, two rods 19 and 20 are extended through the opposite portions 15 and 18 of the key levers and partitions to pivotally mount the key levers and hold same in position.

All of the key levers are extended forwardly through slots 21 in a plate 22 (Fig. I) on the front of the frame, the front plate having upper and lower buffers 23 and 24 upon which the levers may strike to insure noiseless and cushioned action thereof when the machine is in operation, and have upturned forward ends provided with buttons 16'.

In order to prevent more than one key being depressed at a time, I have provided a keeper mechanism comprising a plate 25 (Figs. IV and XXI) which is hung between the front plate 22 and a plate 26, the latter having downwardly opening slots 27 in alinement with the slots 21 of plate 22, and having sockets 28 in its lower edge. Pivotally mounted in the downwardly opening sockets 28 are the heads 29 of depending interlock members 30 comprising shanks 31 between which the forward ends of the key levers are projected, and laterally flared heads 32, which latter are spaced so that when a single key lever is lowered between adjacent heads, all of the heads are moved laterally and closed against each other to prevent a second lever from being lowered until the first has been lifted and the heads released.

In the upper portion of the machine is a hopper 33 (Figs. IV, VI and VII) comprising a base plate 34 which extends across the frame and has a rear cover 35 and a top plate 36. In the upper surface of plate 34 and the lower surface of plate 36 are paired longitudinal grooves 37 and 38, which register with each other and correspond in number with the key levers. Each pair of grooves is adapted for holding tumbler balls 39 in storage in the hopper, with the lower tumblers in each groove resting against a shoulder 40' on the upper end, 40, of a downwardly and forwardly inclined chute 41, which extends between the sides of the frame and comprises a base plate 42 and top plate 43, having paired longitudinal grooves 44—44' formed by ribs 45 and extending in alinement with the grooves 37 and 38 in the hopper, the ribs 45 having pins 45' for stopping the wands prior to each positive feeding action.

At the lower end of each of the hopper grooves 37—38 is an aperture 46 and projecting into each aperture is the finger 47 of a verge lever 48 which is pivotally mounted near its center on a shaft 49 that is mounted in bearings 50 on plate 42. The upper end of each finger is normally flush with the bottom of the groove into which it is projected and the opposite end of the lever is connected with a key lever 16 by a link 51, so that when the key lever is depressed it rocks its lever 48 and lifts the finger and the tumbler resting thereon to deliver that tumbler into the chute, the projection of the finger holding the train of tumblers in the chute groove while the delivery is being made. When the key lever is released it, and the verge lever, are returned to their normal positions by the spring 52.

Arranged along each side of the hopper and chute are side members 53, each having inwardly facing grooves 54 which are inclined to an apex over the junction of the hopper and the chute with their lower ends approaching the chute and their upper ends turned back and terminating near the top of the chute, so that they may deliver spacing members thereinto, as will presently be more fully described.

The spacing members comprise rods 56 of such length that they may extend across the machine, and having end balls 57 adapted for travel in the chute grooves 44—45, and return grooves 54, the latter being of sufficient depth to carry the balls in offset relation (Fig. VIII) so as to increase the efficiency of the returning mechanism.

The spacer rods are also controlled by a verge action, 58, comprising side levers 60 which are pivotally mounted on a shaft 61 that is revolubly mounted in bearings 50 that depend from the underface of the chute and have ears 62 and pins 62′ normally projected into the path of the end balls 57 to hold the spacers above the mouth of the chute, and have stops 63 adapted for projection through the apertures 46 to engage the spacer immediately back of the one released by ears 62 and pins 62′ whereover the verge is rocked.

The verge levers 60 are connected by a bar 64 which lies close to and immediately above ears 65 on the fingers 47 of verge levers 48 so that when any one of the key levers is pressed its particular verge will actuate the common spacer verge against the tension of its spring 66, and release a spacer whenever a tumbler is released.

Pivotally mounted in bearings 67 on the front plate 22 is a verge action 68, comprising a shaft 69 having upwardly projecting end levers 70 provided with inwardly and upwardly opening pockets 71 which are adapted for receiving spacer balls from the grooves 44—44′, and having lips 72 extending inwardly from the rear edges of the pockets to cover the lower ends of the end grooves 44 and 44′ of the chute when the pockets are moved to carry the spacers to the elevator grooves.

Extending through the levers 70, above shaft 69 is a shaft 73, having rearwardly projecting links 74 pivotally connected with bell crank levers 75 which are actuated with each setting actuation of a character, member and operate the lower verge to move the spacers from the chute to the return elevator, as will presently be described.

Revolubly mounted in the sides of the frame is a shaft 77 and fixed on said shaft and extending beneath chute 41 is a cylinder 78, having a plurality of longitudinally extending semicircular flutes 79, the shaft being provided at one end with a gear wheel 80 which meshes with a large gear wheel 81 that is revolubly mounted on a stub shaft 82 having a small gear 83 meshing with a large gear 84 on the spring motor 85, which latter is carried with the frame and has its shaft 86 projected through one side thereof, so that the motor may be moved from a crank 87, through shaft 87′ and gear wheels 88 and 89.

Supported by standards 92 at the sides of the frame is a segment 93 (Figs. X and XI) which is concentric with the cylinder and has grooves 94 on its inner surface, and has bearing surfaces 95 between the grooves in alinement with the grooves 44—45 in the chute, each bearing surface being of substantially the same dimensions and having apertures 96 therein in alinement with like apertures in the other bearing surfaces.

Seated in segment 93 and surrounding cylinder 78 are character rings (Fig. XVII) each of which has a band 97 resting on the bearing surface 95 and provided with apertures 98 which are adapted for registration with the segment apertures 96. At one side of each band 97 is an annular rib 99 which seats in the segment groove 94 and is cut to form character teeth 100, the teeth being arranged in sets equal in number to the apertures 98 in the band 97, and each set being representative of a character in the Morse or other telegraphic code.

Secured to the main frame back of the segment 93 is a bracket 101 (Figs. IV and XIV) and pivotally mounted in said bracket are levers 102, equal in number to the levers on the keyboard and each having a roller 103 adapted for projection into an aperture 98 in a relative character band, the rollers being so arranged with respect to the disk apertures 98 that each will engage in one of the apertures in its disk when another slot is in position for receiving a tumbler, and the levers being provided with springs 104 for holding the rollers yieldingly to their seats.

The ends of levers 102, opposite those carrying the roller extend from the rear face of bracket 101 and have depending links 105 provided with bifurcated ends 106 which engage a bar 109 that connects the bell crank levers 75, so that whenever one of the roller levers is rocked it rocks the front verge and transfers a spacing member from the chute to the elevator, by throwing the levers 70 backward and bringing pockets 71 into registration with the side chute grooves so that the spacer balls will drop into the pockets and be moved forward beneath the elevator grooves 54 as soon as the roller 103 enters another aperture.

When the spacer rod is brought forward it is engaged by constantly revolving star wheels 112, secured to a shaft 113 revolubly mounted in the sides 7 and provided with a gear wheel 114 that meshes with an intermediate gear wheel 115 revolubly mounted on a stub shaft 116, and which, in turn, meshes with the gear 80 on shaft 77.

The star wheels 112 lift the spacing rod into groove 54 so that it will be engaged and held by a hook 118 which is pivotally mounted on a shaft 121 and yieldingly tensioned downward by spring 122.

If the keyboard is operated at such speed that the characters are sent and the spacers returned as fast as the keys are pressed, it is apparent that there will never be more than a single tumbler and spacer in the chute at any one time. When, however, the keyboard is operated faster than the characters are sent the tumblers accumulate in the chute, the spacers being held back by the verges 70, and in turn holding back the tumblers.

Simultaneously with the removal of a spacing rod, the tumbler which has been held back thereby passes into the apertures 98 in a character disk ring and is caught by the constantly revolving cylinder and carries the character disk around until it registers with the apertures 96 in the segment (the travel being equal to the length of one symbol), when the tumbler drops through the aperture 96 into an inclined trough 125 from which it is delivered through a port 126 (Fig. XI) into an elevator casing 127, having a curved inner surface 128 provided with a spiral groove 129.

Revolubly mounted in the elevator casing 127 is a double worm 130 (Fig. XV), the portion 130' of which is adapted to coöperate with groove 129 to move the tumblers into a tube 131 (Fig. XI) which extends upwardly and discharges into the hopper 33, the worm 130 being provided with a gear wheel 132 which derives its power from a gear wheel 133 on shaft 77 through an intermediate gear 134 that is revolubly mounted on stub shaft 135 on the main frame.

Entering tube 131, a short distance above elevator 127, is a tube 136, having a horizontal portion (Fig. XIII) provided with two slots 137 and 137', which are adapted to receive the fingers 138 and 139 on one of the pocket levers 70, the finger 138 being arranged at a lower elevation than the finger 139 and normally held within the outer slot 137' to hold tumblers delivered to the tube in place, the second finger being adapted to be lowered behind the first tumbler in a train of tumblers and hold the train when the finger 138 is removed to release the first in line.

A tumbler thus delivered into tube 136 passes into a groove 142 in the elevator casing 127 and is carried by the portion 143 of the double worm 130 to a tube 144, which extends across the front of the machine.

Tube 144 contains a sliding core 145 (Fig. XXIII) which is yieldingly pressed toward the right hand end of the tube by a spring 146, (Fig. XXII) and fixed to the core and extending through a slot 147 in the front of the tube is a flat tongue 148. Fixed on the end of the tongue 148 is an indicator 149 comprising a roller 150 which is adapted for travel against the front of the machine, and an arrow 151 which is adapted for travel over a dial plate 152 to designate the number of tumblers in the tube, the parts being so arrangd that the spring will press the indicator away from zero position when the tube is empty.

Opening into tube 144, is a tube 153 (Figs. XI and XII) which projects through plate 154 and is adapted for delivery into trough 125, this tube being provided with a verge action 155 comprising a disk 156 which is rigidly secured to a shaft 157 revolubly mounted in bearings 158 on the front of the frame. Disk 156 enters the tube 153 through a slot 159 and has a notch 161 for receiving one of the tumblers so that when the disk is oscillated a tumbler carried in the notch will be delivered to the trough and the body of the disk will arrest the travel of succeeding tumblers.

Secured to shaft 157 is a lever 163 which is connected with the arm 164 (Fig. I) of the upper spacing verge lever 60 by a link 165 so that the verge 155 will be operated each time the spacing verge lever 60 operates, which is each time a key lever is depressed.

Slidably mounted in a bearing 167 on the front plate 22 (Figs. I and XII) is a rod 168 which is yieldingly held in one direction by a spring 169 and has an upturned finger 170 adapted for engagement by the roller 150. The end of the rod opposite the spring is connected with a bell crank lever 171 which is secured to a shaft 172 that is pivotally mounted in the plate 22 and in a bearing 173 on the frame, the other arm of the lever having a depending link 174 pivotally connected with a bar 175 mounted similarly to the key levers 13 and adapted to project between the keeper heads 32 to lock the keyboard.

Rigidly mounted on shaft 172 is a flat spring 176 which is adapted to exert friction against the disk 156 to stiffen the touch of the key levers when nearing the limit of its capacity.

Referring now to the brush and contact maker:

Pivotally mounted in the sides of the machine and extending thereacross below the character disks is a bar 178 (Figs. IV and XXIV) having brushes 179 fixed thereon and adapted to wipe the teeth on the character disks. On one side of the bar is an arm 180, the back part of which has a buffer spring 181 and the front end an insulated tip 182 which is adapted to actuate the contact maker 183.

The contact maker preferably comprises a body portion 184 secured to plate 22 by a screw 185 and insulated therefrom by a fiber bushing 186 and washer 187, and having two rearwardly projecting arms 188 between which a vibrator bar 189 is pivoted and yieldingly held in one direction by a spring 190.

The vibrator bar is adapted to engage a contact screw 191 projected through and grounded on plate 22, and has a rearwardly projecting arm 192 which lies beneath the insulated lip of arm 180, so that when the parts are in normal position the vibrator is not in contact with the screw 191.

A wire 193 is projected into an aperture 194 in the body portion 184, and connects with a binding post 195 that is insulated from the casing 1 and to which one of the line wires 196 is connected, the other line wire 197 being connected with a binding post 198 that is grounded on the casing.

In order to regulate the speed of the motor, I provide a governor (see Figs. I and II) comprising a shaft 199 revolubly mounted in bearings in the side frame and in the bracket 200 carried by the frame and having a pinion 201 at one end which is connected with gear 133 through gear wheels 202, 203, and 204. Pivotally mounted on a collar 205 which is secured in a bifurcated portion of the shaft 199, are governor weights 206 that are yieldingly held toward the shaft by spring 207 extending from a collar 208, and are pivotally connected with a collar 209 which is slidably mounted on the shaft 199. Slidably mounted in a bearing 210 in the side of the frame is a rod 211, which is exposed through an opening 212, and is tensioned by a spring 213 so as to yieldingly hold the rod outward. Revolubly mounted in the casing 1 adjacent the rod 211 is a tapered segment 214 which is rigidly secured to a shaft 215 that projects to the outside of the casing and is provided with a knob 216.

The tapered segment 214 is provided with stop members 217, so that by turning the knob 216 the rod 211 is moved laterally against the tension of spring 213 so as to vary the position of the leather tip 218 on the end of the rod and offer resistance at different points to the collar 209 when the governor has attained a certain speed.

In order to provide the proper spacing between words, I provide a spacing key 220 which is similar to the keys 13 in construction and operation, except that the character disk for the spacing key is without symbols and has no contact brush, its hand 97, however, having apertures 98 spaced a distance equal to three dots, which, with a three dot period of elapsed time in each operation of a character member, gives a six dot space the conventional interval.

In order that a message may be sent by a hand key if desired, I have provided a device of this character, 221, which is grounded on the casing and has insulated connection through the wire 222 to the binding post 195, the key being also used as a switch to close the line.

In using the machine, presuming the parts to be constructed and assembled as described, with the indicator and elevator tubes filled with tumblers and a number of tumblers located within the hopper, when a key lever is struck the verge 48 is rocked, lifting the tumbler for that key lever out of the hopper, and delivering same over the shoulder 40' into the chute, simultaneously lifting the bar 64, and the spacer verge arms connected with said bar, so that as soon as the tumbler has passed into the chute a spacing wand is dropped into the chute back of the tumbler.

There being no obstruction in the chute, both the tumbler and wand travel down therethrough, the tumbler passing from the lower end of the chute into one of the apertures 98 in the band of the character member for the key which has been struck to be engaged by a bead on the fluted cylinder 79 which is revolved constantly from the spring motor when the machine is in operation and turn the character member so as to actuate the brush 179 and circuit maker 183 and transmit the character.

As soon as the character is completed the tumbler drops through aperture 96 into the trough 125 where it rolls down by gravity and passes out through aperture 126 and is engaged by the revolving worm 130 of the elevator.

The groove 130' of the worm 130 coöperates with groove 129 of the elevator casing 127 and forces the tumbler into the tube 131 and against a column of tumblers that have preceded, forcing the column upwardly and depositing the last tumbler at the top into the hopper 33.

When the tumbler has been seated in the character member, the character member is locked to the cylinder and carried around therewith, the revolution of the band ejecting the roller 103 for that character member from its band and rocking the verge levers 70 back beneath the grooves 56 containing the balls on the ends of the spacing wand, so that the said balls are dropped into the pockets in the top of the levers, the latter being held retracted during the operative period of the character member, as the roller travels over the periphery of the band until the character has been completed and a succeeding aperture 98 is brought into position for receiving same.

When the character has been completed and the roller lever and verge 70 are moved back to their original position by the spring 104, the spacer rod is engaged by the elevator star wheel so that the balls are projected into the elevator grooves 56, any wands which are in the grooves being forced upwardly by the incoming wand, so that when the elevator is full the wand at the top of the elevator is dropped down into the feeding portion of the elevator chute, where it travels by gravity to its feeding position.

When the key lever is struck to feed a tumbler into the chute 41, the lever 164, which is operative from the upper spacing verge, rocks the disk 156 to feed a tumbler out of the indicator tube into the trough 125 which empties into the elevator casing, thereby moving the indicator one point, and showing the delivery of the tumbler therefrom. The tumbler passes through the trough 125 and through opening 126 to the elevator casing 127 and up through the return tube 131 in the same manner as tumblers from the character mechanism are elevated.

As soon as the character is completed, rocking of the verge 70 actuates the latch 137 to drop a tumbler from the by-pass tube 136 into the portion of the elevator casing containing the groove 142 through which it is forced into the indicator tube 140 to move the indicator back to zero, it being apparent that when the characters are sent as fast as the key levers are pressed, the indicator will move from zero to one and back with each operation of the key lever.

When, however, the machine is operated at a greater speed, so that tumblers and spacers accumulate in the chute faster than they are delivered to the elevator, each actuation of a key lever releases a tumbler from the indicator and forces same up the return tube to the hopper, so that the indicator moves as many spaces to the right as there are tumblers accumulated in the chute.

When the indicator has moved to its limit it rocks the stop key to lock the key levers, so that no more tumblers can be fed to the chute until the lower tumbler has passed the character mechanism, thereby obviating any danger of the tumblers becoming confused at the top of the chute.

It is apparent that as the teeth of the character members pass over their brushes the contact member is actuated for dots and dashes to send a character of the telegraphic code.

Having thus described my invention, what I claim as new therein and desire to secure by Letters Patent, is:

1. In a telegraph transmitter, character members, driving mechanism common to all of said character members, tumblers for individually connecting said character members with said driving mechanism, spacing members for holding said tumblers in spaced relation, and means for switching said spacing members to release said tumblers.

2. In a telegraph transmitter, character members, driving mechanism comprising normally inert members for actuating the character members, tumblers adapted for coöperation with the normally inert members to render the same operative, devices for spacing the tumblers from the normally inert members, and mechanism for shifting said spacing devices to release the tumblers.

3. In a telegraph transmitter, character members, normally inoperative mechanism for actuating the character members, tumblers adapted for coöperation with the actuating mechanism to render same operative, members adapted for spacing the tumblers from the actuating mechanism, and spacers adapted for travel with the tumblers.

4. In a telegraph transmitter, character members, driving mechanism comprising normally inert members for actuating the character members, tumblers adapted for coöperation with the normally inert members to render the same operative, devices for spacing the tumblers from the normally inert members, mechanism for shifting said spacing devices to release the tumblers, and means for returning the tumblers and spacing devices to initial position.

5. In a telegraph transmitter, character members, normally inoperative mechanism for actuating the character members, tumblers adapted for coöperation with the actuating mechanism to render same operative, members adapted for spacing the tumblers from the actuating mechanism, spacers adapted for travel with the tumblers, means for holding the tumblers and spacers in storage, and means for releasing a tumbler and a spacer simultaneously.

6. In a telegraph transmitter, character members, mechanism for actuating the character members, tumblers adapted for coöperation with the actuating mechanism to render same operative, spacers adapted for travel with the tumblers, means for holding the tumblers and spacers in storage, mechanism for releasing the tumblers and spacers from storage in pairs, and means for shifting a spacer to allow its tumbler to enter the actuating mechanism.

7. In a telegraph transmitter, character members, mechanism for actuating the character members, tumblers adapted for coöperation with the actuating mechanism, spacers for the tumblers, means for selectively feeding the tumblers from storage and for automatically feeding a spacer with each tumbler.

8. In a telegraph transmitter, character members, mechanism for actuating the character members, tumblers adapted for coöperation with the actuating mechanism, spacers for the tumblers, separate storage compartments for the tumblers and spacers, and means for simultaneously releasing a tumbler and a spacer from their respective compartments.

9. In a telegraph transmitter, character members, mechanism for actuating the character members, tumblers adapted for coöperation with the actuating mechanism, spacers for the tumblers, separate storage compartments for the tumblers and spacers, selecting devices for feeding the tumblers, and means operable by any of the selecting devices, for releasing a spacer.

10. In a telegraph transmitter, character members, mechanism for actuating the character members, tumblers adapted for coöperation with the actuating mechanism, spacers adapted for travel with the tumblers, storage compartments for the tumblers and spacers, means for releasing the tumblers and spacers in pairs, and separate elevators for returning the tumblers and spacers to storage.

11. In a telegraph transmitter, character members, mechanism for actuating the character members, tumblers adapted for coöperation with the actuating mechanism, spacers adapted for travel with the tumblers, storage compartments for the tumblers and spacers, a chute leading from the storage compartments to the actuating mechanism, separate means for holding the tumblers and spacers in storage, means for feeding tumblers from storage to the chute selectively, and means for automatically feeding a spacer back of each tumbler.

12. In a telegraph transmitter, character members, mechanism for actuating the character members, a storage chamber, a chute leading from the storage chamber to the actuating mechanism and spaced from the chamber to provide a stop and an aperture, a pivoted member having a tooth projected into said aperture back of said stop, tumblers adapted for storage in said chamber and against said stop, and means for rocking said pivoted member to lift a tumbler over the stop and deliver same to the chute.

13. In a telegraph transmitter, character members, mechanism for actuating the character members, a storage chamber, a chute leading from the storage chamber to the actuating mechanism and spaced from the chamber to provide a stop and an aperture, pivoted members each having a tooth projected into said aperture, tumblers adapted for storage in said chamber and against said stop, selective mechanism for rocking said pivoted members to lift the tumblers and deliver same to the chute, a spacer guide, spacers adapted for travel in said guides, means for holding spacers in storage adjacent the top of the chute, and mechanism operable from any of the pivoted members for actuating said holding means.

14. In a telegraph transmitter, character members, means for actuating the character members, tumbler balls adapted for coöperation with the actuating mechanism, a storage chamber, a chute leading from the storage chamber to the actuating mechanism, guides at the sides of the chute, wands having end members carried in the guides and body members extended across the chute, and means for releasing the tumblers and wands in pairs.

15. In a telegraph transmitter, character members, means for actuating the character members, tumbler balls adapted for coöperation with the actuating mechanism, a storage chamber, a chute leading from the storage chamber to the actuating mechanism, guides at the sides of the chute, wands having end members carried in the guides and body members extended across the chute, means for releasing the tumblers and wands in pairs, and separate means for returning the tumblers and wands to storage.

16. In a telegraph transmitter, character members, mechanism for actuating the character members, tumblers adapted for coöperation with the actuating mechanism, spacers for the tumblers, a stop member projected into the path of the spacers, means for actuating the stop member to release a spacer and a safety member operable with the stop to hold a succeeding spacer when a forward spacer has been released.

17. In a telegraph transmitter, character members, mechanism for actuating the character members, tumblers adapted for coöperation with the actuating mechanism, a storage chamber for the tumblers, a chute leading from the storage chamber to the actuating mechanism, guides at the sides of the chute leading from adjacent the storage chamber to adjacent the actuating mechanism, separate return guides leading back from the actuating mechanism and opening to the first named guides, spacers adapted for combination with the tumblers and for travel in said guides, and means for simultaneously releasing tumblers and spacers to the chute and first named guides.

18. In a telegraph transmitter, character members, mechanism for actuating the character members, tumblers adapted for coöperation with the actuating mechanism, a storage chamber for the tumblers, a chute leading from the storage chamber to the actuating mechanism, guides at the sides of the chute leading from adjacent the storage chamber to adjacent the actuating mechanism, separate return guides leading back from the actuating mechanism and having storage sections opening into the first named guides, spacers adapted for coöperation with the tumblers and for travel in said guides, and means for simultaneously releasing tumblers and spacers to the chute and first named guides.

19. In a telegraph transmitter, character members, mechanism for actuating the character members, a storage bin, a chute leading from the storage bin to the actuating mechanism and spaced from the former, side members having grooves therein leading upwardly from the actuating mechanism and having return sections terminating adjacent the top of the chute, levers having fingers projected into the space between the top of the chute and the storage bin and having lips thereon, tumblers adapted for storage in said bin and for travel through the chute to the actuating mechanism, means for actuating said levers to forward the tumblers into the chute, spacers adapted for travel in said guides, levers having means thereon for holding the spacers at the top of the chute, and a bar connecting the spacer levers and adapted for operative engagement by the lips of any of the tumbler levers to feed a spacer simultaneously with the feeding of a tumbler.

20. In a telegraph transmitter, character members, mechanism for actuating the character members, a chute leading to the actuating mechanism and comprising upper and lower plates having mating longitudinal grooves therein, means for holding tumblers at the top of the chute, tumblers adapted for storage in said holding means and for travel in said chute, means for forwarding tumblers selectively to the chute grooves, spacers adapted for extension across the chute and for travel with the tumblers, and means operable by the tumbler feeding mechanism for feeding a spacer with each tumbler.

21. In a telegraph transmitter, character members, mechanism for actuating the character members, tumblers adapted for coöperation with the actuating mechanism, means for conducting the tumblers in separate paths to said actuating mechanism, and spacers adapted for extension across all of said paths and for travel with the tumblers to the actuating mechanism.

22. In a telegraph transmitter, character members, mechanism for actuating the character members, tumblers adapted for coöperation with the actuating mechanism, means for conducting the tumblers to the actuating mechanism, side members having grooves extending along the chute, and spacers comprising rods adapted for extension across the chute and having balls on their ends located within said grooves and adapted for travel therein.

23. In a telegraph transmitter, character members, mechanism for actuating the character members, tumblers adapted for coöperation with the actuating mechanism, spacers adapted for travel with the tumblers, return guides for the spacers, and mechanism for positively forcing said spacers through the return guides.

24. In a telegraph transmitter, character members, tumbler mechanism for actuating the character members, spacers adapted for coöperation with the tumbler mechanism and comprising wands, guides through which the wands are returned to initial position, and a star wheel located at the end of said guides and adapted for forcing said wands through the return guides.

25. In a telegraph transmitter, character members, tumbler mechanism for actuating the character members, spacers adapted for coöperation with the tumbler mechanism and comprising wands, guides through which the wands are returned to initial position, a star wheel located at the end of said guides and adapted for forcing said wands through the return guides, and hooks adapted for lifting an on-coming wand and for holding said wand in its forward position.

26. In a telegraph transmitter, character members, tumbler mechanism for actuating the character members, means adapted for coöperation with said tumbler mechanism comprising wands, a guide for conducting said wands adjacent the tumbler mechanism, a return guide spaced from the first named guide, and a stop adapted for holding said wands in the first named guide and for oscillation to conduct each wand separately to the return guide.

27. In a telegraph transmitter, character members, tumbler mechanism for actuating the character members, means adapted for coöperation with said tumbler mechanism comprising wands having knobs thereon, a guide for conducting said wands adjacent the actuating mechanism, a return guide spaced from the first named guide, a stop adapted for holding said wands in the first named guide, and a pocket adapted for receiving the wand knobs and for conducting the wands to the return guide.

28. In a telegraph transmitter, character members, tumbler mechanism for actuating the character members, means adapted for coöperation with the tumbler mechanism comprising wands having knobs thereon, guides for conducting the wands adjacent the tumbler mechanism, return guides for conducting the wands to initial position, oscillatory members having lips normally projected beneath the first named guides to hold the wands therein, pockets adapted for receiving the wand knobs, means for reciprocating said members, and means for moving said wands from said members to the return guides.

29. In a telegraph transmitter, character members, tumbler mechanism for actuating the character members, means adapted for coöperation with the tumbler mechanism comprising wands having knobs thereon, guides for conducting the wands adjacent the tumbler mechanism, return guides for conducting the wands to initial position, oscillatory members having lips normally projected beneath the first named guides to hold the wands therein, pockets adapted for receiving the wand knobs, means for reciprocating said members, and star wheels located adjacent said members and adapted for lifting said wands from the members to the return guides.

30. In a telegraph transmitter, character members, tumbler mechanism for actuating the character members, means adapted for coöperation with the tumbler mechanism comprising wands having knobs thereon, guides for conducting the wands adjacent the tumbler mechanism, return guides for conducting the wands to initial position, oscillatory members having lips normally projected beneath the first named guides to hold the wands therein, pockets adapted for receiving the wand knobs, means for reciprocating said members, star wheels located adjacent said members and adapted for lifting said wands from the members to the return guides, and hooks adapted for automatic movement to receive the wands and for holding the latter in the return grooves.

31. In a telegraph transmitter, character members, tumbler mechanism for actuating the character members, means adapted for coöperation with the tumbler mechanism comprising wands, guides for conducting the wands adjacent the tumbler mechanism, guides for returning the wands to initial position, a stop for supporting the wands in the first named guides and for carrying said wands to the return guides, and a shifting device operable by the tumbler mechanism for moving said stop members between the guides.

32. In a telegraph transmitter, character members, mechanism for actuating the character members, guides leading to the character members, tumblers adapted for actuating mechanism, tumblers adapted for travel in said guides, spacers adapted for travel with the tumblers, means for holding the spacers adjacent the actuating mechanism, and means for shifting said mechanism, and means for shifting said spacers to allow the tumblers to enter the actuating mechanism.

33. In a telegraph transmitter, a character member comprising a freely revoluble band, a driver, tumbler means for engaging the band with the driver to advance the band and means for holding the same in set position prior to engagement with the driver.

34. In a telegraph transmitter, a character member comprising a freely revoluble band, having sets of character teeth therein and having apertures spaced equally to the spacing of the teeth sets, means for advancing said band and means projectable into said apertures for determining positions of the band with respect to said advancing means.

35. In a telegraph transmitter, a grooved support, a character member comprising a body portion having a lip adapted for travel in the support groove, character teeth on the character member, a circuit closer adapted for actuation by the character teeth, and means for actuating said body member.

36. In a telegraph transmitter, an arcuatile support having a groove therein, a character member comprising a band adapted for revoluble travel on said support and having a lip projected into said groove, character teeth on the band, means for actuating the band, and a circuit closer adapted for actuation by said teeth.

37. In a telegraph transmitter, a character member comprising a revoluble band having an aperture therein, character teeth on the band, a circuit closer adapted for actuation by the character teeth, a driving member located within the band, and a tumbler adapted for projection through the band aperture into engagement with the driving member.

38. In a telegraph transmitter, an apertured support, a character member adapted for travel on the support and having an aperture therein adapted for registration with the aperture in the support, a driving member within the character member, a tumbler adapted for projection through the body member into operative engagement with the driving member and for escape through the aperture in the support, and a circuit closer adapted for actuation by the character member.

39. In a telegraph transmitter, a grooved and apertured support, a character member adapted for revoluble travel on the support and having a rib adapted for travel in the support groove and an aperture adapted for registration with the support aperture, a pinion located within the character member, a tumbler adapted for projection through the aperture in the character member into operative engagement with the pinion and for dropping through the support aperture to disconnect the parts, means for actuating the pinion, and a circuit closer operable by the character member.

40. In a telegraphic transmitter, a grooved and apertured support, a character member adapted for revoluble travel on the support and having a rib adapted for travel in the support groove and an aperture adapted for registration with the support aperture, a pinion located within the character member, a tumbler adapted for projection through the aperture in the character member into operative engagement with the pinion and for dropping through the support aperture to disconnect the parts, means for actuating the pinion, a circuit closer operable by the character member, and a stop member adapted for projection into the aperture in the character member to hold said character member in a set position.

41. In a telegraphic transmitter, a grooved and apertured support, a character member adapted for revoluble travel on the support and having a rib adapted for travel in the support groove and an aperture adapted for registration with the support aperture, a pinion located within the character member, a tumbler adapted for projection through the aperture in the character member into operative engagement with the pinion and for dropping through the support aperture to disconnect the parts, means for actuating the pinion, a circuit closer operable by the character member, and a stop member adapted for projection into the aperture in the character member to hold said character member in a set position, and for travel over the character member while the latter is in operation.

42. In a telegraph transmitter, a character member comprising a band having a plurality of apertures therein, sets of character teeth spaced about said bands and in relative relation to said apertures, means for supporting said band, a pinion located within the band, a tumbler adapted for projection through the band apertures to lock the band to the pinion, stops adapted for projection into said band apertures to hold the band in set position, means for actuating the pinion, and a circuit closer adapted for actuation by the character teeth.

43. In a telegraph transmitter, a plurality of character members comprising apertured bands having character teeth near one edge, means coöperating with one of the band apertures for actuating the character member, and variously disposed stop members adapted to yieldingly engage another of the band apertures to determine the inactive position of the character member.

44. In a telegraph transmitter, a character member comprising a band having apertures therein and provided with character teeth, a stop member comprising a pivotally mounted arm having a roller adapted for projection into an aperture in said band to hold the latter in set position and for travel over the periphery of the band when the character member is in operation, and means for yieldingly tensioning said roller toward the character member.

45. In a telegraph transmitter, character mechanism and means for actuating same, a stop yieldingly tensioned toward the character mechanism, tumblers adapted for coöperation with the actuating means, spacers for holding the tumblers out of such coöperation, and means operable by said stops for shifting the spacers.

46. In a telegraph transmitter, character mechanism, and means for actuating same, members yieldingly tensioned toward the character mechanism, tumblers adapted for coöperation with the actuating mechanism, means for retaining said tumblers out of such coöperation and comprising a rocking lever, and a bar connected with said rocking lever and operable by the stop member.

47. In a telegraph transmitter, a plurality of character members and means for actuating same, a rocking member yieldingly tensioned toward each character member, tumblers adapted for coöperation with the actuating mechanism, spacers for retaining said tumblers out of such coöperation, and means operable by any of said rocking members for shifting said spacers.

48. In a telegraph transmitter, circuit closing mechanism comprising tumblers and a tumbler returning mechanism comprising a screw, and a conduit through which tumblers are elevated by said screw.

49. In a telegraph transmitter, a circuit closing mechanism, character members for actuating said circuit closing mechanism, tumblers for actuating said character members, means for selectively accumulating said tumblers, and means operable by an active tumbler for forwarding another tumbler to a character member.

50. In a telegraph transmitter, circuit closing mechanism, tumblers adapted for coöperation with the circuit closing mechanism, a grooved conduit adapted for receiving tumblers from the circuit closing mechanism, and means for forcing said tumblers through the grooved conduit.

51. In a telegraph transmitter, circuit closing mechanism, an indicator and tumblers adapted for selective accumulation and for actuating said indicator.

52. In a telegraph transmitter, circuit closing mechanism, tumblers adapted for coöperation with the circuit closing mechanism, means for returning the tumblers, an indicator operable by the tumblers, and means for feeding a tumbler to the indicator when a tumbler is fed to the circuit closing mechanism.

53. In a telegraph transmitter, circuit closing mechanism, tumblers adapted for coöperation with the circuit closing mechanism, a conduit for returning the tumblers to initial position, an indicator operable by the tumblers, and means for feeding a tumbler from the conduit to the indicator when a tumbler is fed to the circuit closing mechanism.

54. In a telegraph transmitter, circuit closing mechanism, tumblers adapted for coöperation with the circuit closing mechanism, an indicator guide, an indicator having a base adapted for travel in said guide, and means for feeding tumblers to said guide to actuate the indicator.

55. In a telegraph transmitter, circuit closing mechanism, tumblers adapted for coöperation with the circuit closing mechanism, an indicator guide, an indicator having a base adapted for travel in said guide, a spring for yieldingly tensioning said indicator in one direction, and means for feeding tumblers to said guide to actuate the indicator against the tension of said spring.

56. In a telegraph transmitter, circuit closing mechanism, tumblers adapted for coöperation with the circuit closing mechanism, a return conduit for the tumblers, an indicator guide, an indicator having a base adapted for travel in said guide, a conduit leading from the guide to the return conduit, means for feeding tumblers to said guide, and mechanism controlling the delivery of tumblers from the guide conduit to the return conduit.

57. In a telegraph transmitter, circuit closing mechanism, tumblers adapted for coöperation with the circuit closing mechanism, means for releasing said tumblers, a conduit for returning the tumblers, an indicator guide, an indicator adapted for travel in said guide, a conduit adapted for delivering tumblers from the guide to the return conduit, and means operable by the tumbler releasing means for controlling the delivery of said tumblers from the guide conduit.

58. In a telegraph transmitter, circuit closing mechanism, tumblers adapted for coöperation with the circuit closing mechanism, means for releasing said tumblers, a conduit for returning the tumblers, an indicator guide, an indicator adapted for travel in said guide, a conduit adapted for delivering tumblers from the guide to the return conduit, means operable by the tumbler releasing means for controlling the delivery of said tumblers from the guide conduit, and means operable by the indicator for locking said controlling means.

59. In a telegraph transmitter, circuit closing mechanism, tumblers adapted for coöperation with the circuit closing mechanism, an indicator guide, an indicator having a base member adapted for travel in said guide, means for delivering tumblers to the guide, a conduit opening from the guide, a verge member projected into the conduit and controlling delivery of tumblers therefrom, means for releasing the tumblers to the circuit closing mechanism, and connection between the releasing means and verge member whereby a tumbler is delivered from said circuit whenever a tumbler is released to the circuit closing mechanism.

60. In a telegraph transmitter, circuit closing mechanism, tumblers adapted for coöperation with the circuit closing mechanism, an indicator guide, an indicator having a base member adapted for travel in said guide, means for delivering tumblers to the guide, a conduit opening from the guide, a verge member projected into the conduit and controlling delivery of tumblers therefrom, means for releasing the tumblers to the circuit closing mechanism, and connection between the releasing means and verge members whereby a tumbler is delivered from said conduit whenever a tumbler is released to the circuit closing mechanism, and a shaft having lips thereon adapted for engagement by the indicator and for engagement with the verge member, for the purpose set forth.

61. In a telegraph transmitter, a circuit closer, tumblers adapted for coöperation with the circuit closer, a driving member for engaging said tumblers to actuate said circuit closer, and means for controlling said tumblers.

62. In a telegraph transmitter, circuit closing mechanism, tumblers adapted for coöperation with the circuit closing mechanism, a keyboard for selectively controlling said tumblers, an indicator guide, an indicator in said guide, means for delivering tumblers to the guide, a conduit opening from the guide, a verge member projected into the conduit and controlling the delivery of tumblers therefrom, means for releasing the tumblers to the circuit closing mechanism, and connection between the releasing means and verge member whereby a tumbler is delivered from said conduit whenever a tumbler is released to the circuit closing mechanism, and means controlled by the indicator for locking said keyboard.

63. In a telegraph transmitter, circuit closing mechanism, tumblers adapted for coöperation with the circuit closing mechanism, verge mechanism for releasing said tumblers to the circuit closer, a keyboard for selectively actuating said verge mechanism, an indicator guide, an indicator in said guide, a screw for removing spent tumblers from the circuit closer, a conduit for receiving said spent tumblers, a verge operable from the circuit closing mechanism for removing a spent tumbler from said screw conduit, at each operation of the circuit closing mechanism, a second screw for forcing said spent tumbler into said indicator guide, a branch on said indicator guide, and a verge operable from the keyboard to remove a tumbler from said indicator guide each time a tumbler is released to the circuit closer.

64. In a telegraph transmitter, a circuit closing mechanism, tumblers adapted for coöperation with the circuit closing mechanism, verge mechanism for releasing said tumblers to the circuit closer, a keyboard for selectively actuating said verge mechanism, an indicator guide, an indicator in said guide, a screw for removing spent tumblers from the circuit closer, a conduit for receiving said spent tumblers, a verge operable from the circuit closing mechanism for removing a spent tumbler from said screw conduit at each operation of the circuit closing mechanism, a screw for forcing said spent tumbler into said indicator guide, a branch on said indicator guide, a verge operable from the keyboard to remove a tumbler from said indicator guide each time a tumbler is released to the circuit closer, a friction member adapted to coöperate with said keyboard verge, a shaft slidably mounted adjacent said indicator and operatively connected with said friction member, and a stop on said shaft adapted for engagement by said indicator near its maximum position to actuate said friction member and increase the touch pressure on said keyboard.

65. In a telegraph transmitter, a circuit closing mechanism, tumblers adapted for coöperation with said circuit closing mechanism, an indicator, means whereby a tumbler is released to the circuit closing mechanism and a second tumbler to the indicator upon each actuation of the keyboard, means for releasing a tumbler from the indicator upon each actuation of the circuit closer, and means operable from the indicator for locking the keyboard.

66. In a telegraph transmitter, a circuit closing mechanism, tumblers adapted for coöperation with said circuit closing mechanism, an indicator, means whereby a tumbler is released to the circuit closing mechanism and a second tumbler to the indicator upon each actuation of the keyboard, means for releasing a tumbler from the indicator upon each actuation of the circuit closer, means operable from the indicator for locking the keyboard, and means operable from said indicator prior to the keyboard locking means for increasing the touch pressure on said keyboard.

67. In a telegraph transmitter, a circuit closing mechanism, character members for actuating said circuit closing mechanism, tumblers for actuating said character members, means for selectively accumulating said tumblers, means for determining the inactive position of said character members, and means operable by said last named means for forwarding another tumbler to a character member.

68. In a telegraph transmitter, a plurality of character members, tumblers for actuating said character members to transmit telegraphic characters, spacers for said tumblers, means for selectively accumulating said tumblers and spacers, yieldable means for holding said character members in inactive position and means operable by said yieldable means for switching said spacers to release said tumblers.

69. In a telegraph transmitter, a plurality of character members, tumblers for actuating said character members to transmit telegraphic characters, means for selectively accumulating said characters, and means governed by the length of the character for releasing a tumbler to the next character member.

70. In a telegraph transmitter, a plurality of character members, tumblers for actuating said character members to transmit telegraphic characters, a hopper for said tumblers, and means for delivering a tumbler to said hopper each time a character is transmitted.

71. In a telegraph transmitter, a plurality of character members, tumblers for actuating said character members to transmit telegraphic characters, a hopper, spacers for selectively separating said tumblers, and means for delivering a tumbler and spacer to said hopper each time a character is transmitted.

72. In a telegraph transmitter, a plurality of character members, tumblers for actuating said character members to transmit telegraphic characters, a hopper and means for delivering said tumblers to any of said characters.

73. In a telegraph transmitter, a plurality of character members, tumblers for actuating said character members to transmit telegraphic characters, a hopper and means for delivering tumblers from any of said characters to said hopper.

74. In a telegraph transmitter, a plurality of character members, tumblers for actuating said character members to transmit telegraphic characters, a hopper, means for delivering a tumbler from said hopper, and means for delivering a tumbler to said hopper simultaneously with the delivery of a tumbler from said hopper.

75. In a telegraph transmitter, a plurality of character members, tumblers for actuating said character members to transmit telegraphic characters, a hopper, means for delivering tumblers to said hopper, and means for delivering tumblers from said hopper irrespective of the speed of delivery to the hopper.

76. In a telegraph transmitter, a plurality of character members, tumblers for actuating said character members to transmit telegraphic characters, a hopper, means for delivering tumblers to said hopper at random, and means for selectively discharging said tumblers from said hopper.

77. In a telegraph transmitter, a plurality of character members, tumblers for actuating said character members to transmit telegraphic characters, a hopper, a storage chamber, means for selectively delivering tumblers from said hopper to said storage chamber, and means for returning said tumblers to said hopper.

In testimony whereof I affix my signature in presence of two witnesses.

EDWIN H. PIERSEN.

Witnesses:
LEWIS L. MILLER,
LETA E. COATS.